US008305645B2

(12) United States Patent
Gotoh et al.

(10) Patent No.: US 8,305,645 B2
(45) Date of Patent: Nov. 6, 2012

(54) IMAGE PROCESSING AND/OR FORMING APPARATUS FOR PERFORMING BLACK GENERATION AND UNDER COLOR REMOVAL PROCESSES ON SELECTED PIXELS, IMAGE PROCESSING AND/OR FORMING METHOD FOR THE SAME, AND COMPUTER-READABLE STORAGE MEDIUM FOR STORING PROGRAM FOR CAUSING COMPUTER TO FUNCTION AS IMAGE PROCESSING AND/OR FORMING APPARATUS FOR THE SAME

(75) Inventors: Makio Gotoh, Nara (JP); Masanori Minami, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1059 days.

(21) Appl. No.: 11/601,318

(22) Filed: Nov. 16, 2006

(65) Prior Publication Data
US 2007/0121136 A1 May 31, 2007

(30) Foreign Application Priority Data
Nov. 25, 2005 (JP) ................. 2005-341145

(51) Int. Cl.
H04N 1/409 (2006.01)
H04N 1/407 (2006.01)
H04N 1/60 (2006.01)
G03F 3/08 (2006.01)

(52) U.S. Cl. ......... 358/3.26; 358/1.9; 358/2.1; 358/518; 358/529; 358/532

(58) Field of Classification Search .................. None
See application file for complete search history.

(56) References Cited

U.S. PATENT DOCUMENTS

| 6,118,550 | A | * | 9/2000 | Hayashi | 358/296 |
| 6,980,327 | B2 | * | 12/2005 | Yamamoto et al. | 358/1.9 |
| 2004/0252316 | A1 | * | 12/2004 | Miyagi et al. | 358/1.9 |
| 2005/0018903 | A1 | * | 1/2005 | Miyagi et al. | 382/167 |

FOREIGN PATENT DOCUMENTS

| JP | 07-184075 | | 7/1995 |
| JP | 2001-223915 | * | 8/2001 |
| JP | 2003-264701 | * | 9/2003 |
| JP | 2005-244455 A | | 9/2005 |

OTHER PUBLICATIONS

JP_2001223915 Machine Translation From JPO, Minami, Aug. 17, 2001.*
JP_2003-264701 USPTO Partial Translation, OTSU, Sep. 19, 2003.*

* cited by examiner

Primary Examiner — Vincent Rudolph
Assistant Examiner — Peter L Cheng
(74) Attorney, Agent, or Firm — Edwards Wildman Palmer LLP; David G. Conlin; David A. Tucker

(57) ABSTRACT

A segmentation process section classifies signals of pixels in input image data into respective signals of a black text/low density area, a black text/high density area, a color text area, and an area other than a text area. A black generation and under color removal section performs an under color removal process with respect to the signal of the black text/low density area so that an amount of UCR is a middle value (C, M, Y) of signals indicative of color component density levels. Consequently, it is possible to prevent color fringing and a white spot at a time when chromatic aberration occurs in the input image data.

7 Claims, 10 Drawing Sheets

DETECTION OF TRANSVERSE EDGE

DETECTION OF LONGITUDINAL EDGE

EDGE

FILTER COEFFICIENT OF CURRENT PIXEL
FILTER COEFFICIENT OF PERIPHERAL PIXEL

| -1 |   | -1 |
|----|---|----|
|    | 4 |    |
| -1 |   | -1 |

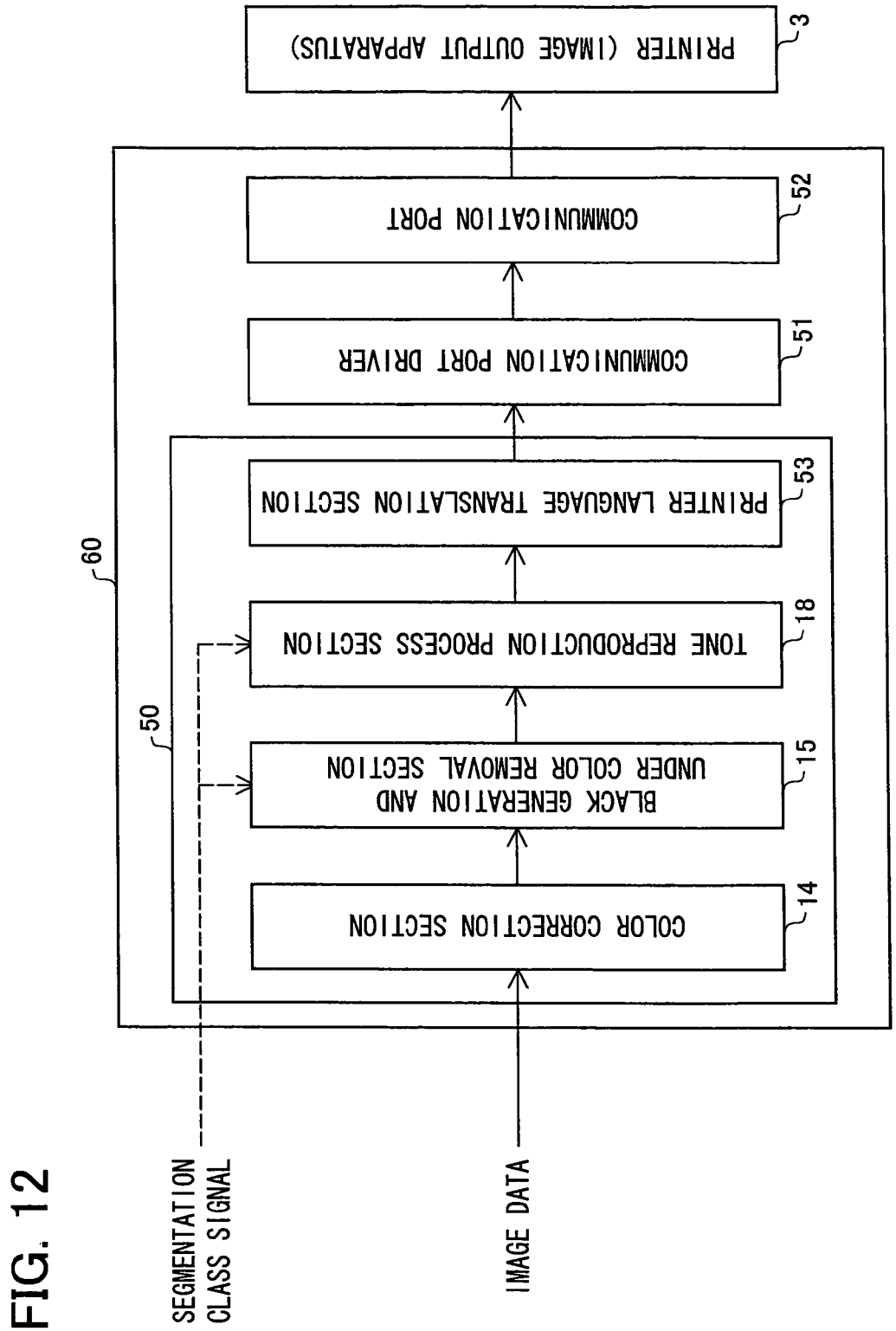

IMAGE PROCESSING AND/OR FORMING APPARATUS FOR PERFORMING BLACK GENERATION AND UNDER COLOR REMOVAL PROCESSES ON SELECTED PIXELS, IMAGE PROCESSING AND/OR FORMING METHOD FOR THE SAME, AND COMPUTER-READABLE STORAGE MEDIUM FOR STORING PROGRAM FOR CAUSING COMPUTER TO FUNCTION AS IMAGE PROCESSING AND/OR FORMING APPARATUS FOR THE SAME

This non-provisional application claims priority under 35 U.S.C. §119(a) on Patent Application No. 341145/2005 filed in Japan on Nov. 25, 2005, the entire contents of which are hereby incorporated by reference.

FIELD OF THE INVENTION

The present invention relates to an image processing apparatus for performing a color conversion process, in which input image data read out from a color image input apparatus such as a scanner is converted into output image data including black. To be specific, the present invention relates to control of black generation and under color removal.

BACKGROUND OF THE INVENTION

An image forming apparatus such as a digital color copying machine converts RGB (red, green, blue) image data read out by an image input apparatus such as a scanner into four colors of CMYK (cyan, magenta, yellow, black) and outputs the colors. In a case where the image forming apparatus copies an original document which includes texts and halftone dot images, in order to improve image quality of black texts of the document, there is performed a process in which edges of black texts are extracted and filtered so that the edges are enhanced, or a process in which amounts of CMY are dropped while an amount of black is increased before outputting the image.

However, in a case where the image input apparatus such as a scanner reads an image, there is a possibility that reading position of a CCD sensor is aberrant due to mechanical vibration or other cause (chromatic aberration) and color fringing (out of color registration) in which edges of black texts are stained with colors is occurred. In an area where the color fringing occurs, CMY is unbalanced. Consequently, in the area, if there is performed a generally-performed under color removal process based on a minimum value of CMY (a value having the lowest level out of respective levels of C density signal, M density signal, and Y density signal), then an enough amount (density) of black is not generated, which raises such a problem that small black texts are difficult to be read or black lines are stained with colors.

Therefore, the applicant of the present application proposed in Document 1 a method in which: an input image is subjected to a segmentation process and text areas are extracted, the text areas are classified into a black text area, a color fringing area, and other area, an amount of black generation is controlled with respect to each area, and as for pixels of the color fringing area, an amount of black generation is determined based on an average value between a maximum value and a minimum value of image data having a plurality of color components (CMY).

Further, Document 2 discloses a technique in which: differences between two colors of different combinations of three primary colors read out from a color original document are calculated, a maximum value of the differences is obtained for each pixel, the maximum value is compared with a threshold value so that the pixel is classified as a chromatic area or an achromatic area, and the pixel classified as the achromatic area is formed only with a black toner.

(Document 1)
Japanese Unexamined Patent Publication No. 223915/2001 (Tokukai 2001-223915; published on Aug. 17, 2001)
(Document 2)
Japanese Unexamined Patent Publication No. 184075/1995 (Tokukaihei 7-184075; published on Jul. 21, 1995)
(Document 3)
Japanese Unexamined Patent Publication No. 264701/2003 (Tokukai 2003-264701; published on Sep. 19, 2003)

However, the above-mentioned conventional techniques have such a problem that color fringing and a white spot (peripheries of black texts or black lines are represented with white or gray) cannot be overcome at the same time.

Table 1 describes characteristics of the conventional techniques (color fringing at a time of chromatic aberration, a white spot at a time of chromatic aberration (white spot generated around texts and lines on a chromatic page background and on halftone dots), and characteristics of a circuit (hardware) configuration). Note that in Table 1, characteristics of the conventional techniques are represented from a less preferable state to a more preferable state by using signals of X, Δ, ◯, ⊙.

TABLE 1

|  | Color fringing | White spot | Circuit configuration |
| --- | --- | --- | --- |
| Conventional general technique (UCR based on min (CMY)) | X | ⊙ | ⊙ |
| Technique of Document 1 (process is switched by recognizing blurred area) | ◯~X | Δ~X | X |
| Technique of Document 2 (only black is processed) | ⊙ | X | Δ |

As illustrated in Table 1, in the conventional general technique, namely, in a technique in which UCR based on a minimum value of CMY is performed, a process of UCR is not switched with respect to each area, so that it is unnecessary to provide a new circuit for switching the process, and a white spot does not occur. However, as described above, when chromatic aberration occurs, a color component (color fringing) is clearly represented.

Further, the technique of Document 1 has such a problem that it is difficult to exactly discriminate a color fringing area in a current technique standard and therefore image quality is liable to be deteriorated due to misdiscrimination of the color fringing area. Namely, color fringing does not occur uniformly (color is greatly aberrant at one time and color is slightly aberrant at another time) and therefore a color fringing area is not recognized with high exactness in the current technique standard. Consequently, an original document on which a color line and a black line are actually written or an image in which a periphery of a text or a line is represented with colors is liable to be wrongly recognized as a color fringing area. In particular, a black edge (a periphery of a black text or a black line) on a colored paper or a halftone dot image is liable to be wrongly recognized, which deteriorates image quality. Further, Document 1 has such a problem that a circuit is necessary for recognizing a color fringing area and therefore circuit configuration becomes complex.

Further, the technique of Document 2 has such a problem that a periphery of a black text or a black line is represented with white or gray (white spot). Namely, in the technique of Document 2, a black text having low density is recognized as an achromatic area and represented only with black. Consequently, it is possible to prevent color fringing, but a page background component and a halftone dot component are also formed only with black, so that a white spot is generated. Further, a switching circuit for changing all processes of CMYK in accordance with a discriminated area is necessary, which complexes circuit configuration.

SUMMARY OF THE INVENTION

The present invention was made in view of the foregoing problems. An object of the present invention is to provide an image processing apparatus and an image processing method, each of which allows for reducing color fringing and a white spot even when chromatic aberration occurs in input image data.

In order to solve the problem, the image processing apparatus of the present invention is an image processing apparatus, which performs a black generation process and an under color removal process with respect to image data including a plurality of color components, comprising: a segmentation section for judging whether each pixel or each block including a plurality of pixels in the image data belongs to a black text area or not; and an under color removal section for performing the under color removal process with respect to the image data, the under color removal section performing the under color removal process so that an under color removal value for each pixel of at least a part of pixels judged by the segmentation section to belong to a black text area is larger than a minimum color component density level and smaller than a maximum color component density level.

Further, in order to solve the problem, the image processing method of the present invention is an image processing method, in which a black generation process and an under color removal process are performed with respect to image data including a plurality of color components, comprising the steps of: (I) judging whether each pixel or each block including a plurality of pixels in the image data belongs to a black text area or not; and (II) performing the under color removal process with respect to the image data, in the step (II), an under color removal value for each pixel of at least a part of pixels judged in the step (I) to belong to a black text area being set to be larger than a minimum color component density level and smaller than a maximum color component density level of the pixel.

With the arrangement, the segmentation section judges whether each pixel or each block including a plurality of pixels in image data belongs to a black text area or not. Further, the under color removal section performs the under color removal process so that the under color removal value for each pixel of at least a part of pixels judged by the segmentation section to belong to the black text area is larger than a minimum color component density level and smaller than a maximum color component density level. Consequently, it is possible to set the under color removal value for each pixel of at least a part of pixels judged to belong to the black text area to be larger than an under color removal value in a conventional case where the under color removal value is set to be a minimum color component density level, which results in reduction of color fringing in the black text area. Further, by setting the under color removal value for the pixel to be smaller than a maximum color component density level, it is possible to leave a color component of a page background in the pixel (for example, a color component of a color page background or a halftone dot in image data obtained by reading a text on the color page background or a text on the halftone dot), which prevents a white spot on the black text area.

The image forming apparatus of the present invention includes the above image processing apparatus. Therefore, the image forming apparatus can output an image with a high quality, in which color fringing and a white spot on a periphery of a black text or a black line is reduced.

The image processing program of the present invention causes a computer to function as each section included in the image processing apparatus. By causing a computer to read the program, it is possible for the computer to realize the process of each section of the image processing apparatus of the present invention.

Further, by storing the program in a computer-readable storage medium, it is possible to easily store and circulate the program. Further, by causing the computer to read the storage medium, it is possible for the computer to perform the process of each section of the image processing apparatus of the present invention.

For a fuller understanding of the nature and advantages of the invention, reference should be made to the ensuing detailed description taken in conjunction with the accompanying drawings.

BRIEF DESCRIPTION OF THE DRAWINGS

FIG. 12 is a block diagram illustrating a structure of a printer driver included in a computer, which printer driver performs a black generation and under color removal process in the image processing apparatus of an embodiment of the present invention.

DESCRIPTION OF THE EMBODIMENTS (1.1 Structure of Image Forming Apparatus 100)

Figure 1:
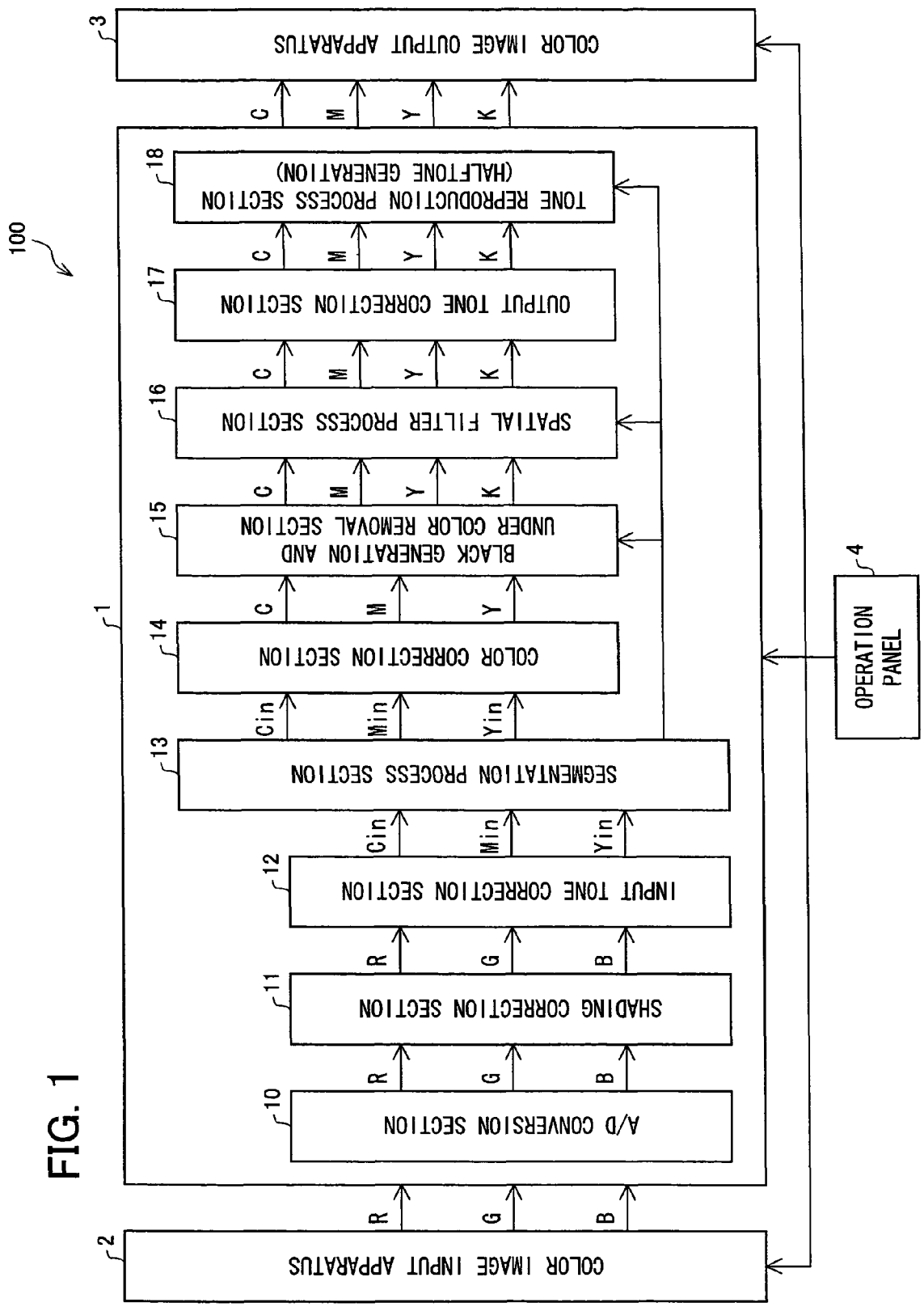
FIG. 1 is a block diagram illustrating outlines of an image processing apparatus and an image forming apparatus of an embodiment of the present invention.

The following explains an embodiment of the present invention. FIG. 1 is a block diagram illustrating an outline of an image forming apparatus 100 of the present embodiment.

As illustrated in FIG. 1, the image forming apparatus 100 is a digital color copying machine which includes an image input apparatus 2, an image processing apparatus 1, an image output apparatus (image forming apparatus) 3, and an operation panel 4.

The image input apparatus (color image input apparatus) 2 generates RGB (first color components) analog signals and supplies the signals to the image processing apparatus 1. The image input apparatus 2 includes a scanner section for example and reads a reflective light image from an original document as RGB analog signals by use of a CCD (Charge Coupled Device), and supplies the signals to the image processing apparatus 1.

The image processing apparatus (color image processing apparatus) 1 converts RGB analog signals inputted from the image input apparatus 2 into CMYK (second color components) digital color signals and supplies the signals thus converted to the image output apparatus 3. Note that, the image processing apparatus 1 may be arranged so as to convert not only signals inputted from the image input apparatus 2 but also signals inputted via a network, a storage medium, and the like into digital color signals. The image processing apparatus 1 is detailed later.

The image output apparatus (color image output apparatus) 3 outputs image data (CMYK digital color signals) inputted from the image processing apparatus 1 to a storage medium (such as a paper). The image output apparatus 3 is not particularly limited in terms of its structure and may be an image output apparatus adopting an electrophotography method or an ink-jet method for example.

The operation panel 4 includes: a display section such as a liquid crystal display; and an operation input section such as setting buttons. A control section (CPU (Central Processing Unit)) (not shown) controls an operation of each section of the image input apparatus 2, the image processing apparatus 1, and the image output apparatus 3, respectively, in response to information entered via the operation panel 4.

(1.2 Structure of Image Processing Apparatus 1)

Next, the following details the image processing apparatus 1. As illustrated in FIG. 1, the image processing apparatus 1 includes an A/D conversion section 10, a shading correction section 11, an input tone correction section 12, a segmentation process section 13, a color correction section 14, a black generation and under color removal section 15, a spatial filter process section 16, an output tone correction section 17, and a tone reproduction process section (halftone generating section) 18.

Analog signals inputted from the image input apparatus 2 to the image processing apparatus 1 are transmitted to the A/D conversion section 10, the shading correction section 11, the input tone correction section 12, the segmentation process section 13, the color correction section 14, the black generation and under color removal section 15, the spatial filter process section 16, the output tone correction section 17, and the tone reproduction process section 18 in this order, and are inputted to the image output apparatus 3 as CMYK digital color signals.

The A/D (analog/digital) conversion section 10 converts RGB analog signals into RGB digital signals.

The shading correction section 11 performs a process for removing various distortions generated in an illumination system, an image focusing system, and an image sensing system of the image input apparatus 2 from the RGB digital signals transmitted from the A/D conversion section 10.

The input tone correction section 12 converts RGB signals (RGB reflectance signals) from which various distortions are removed by the shading correction section 11 into signals such as density (pixel value) signals, which are easily dealt with an image processing system used in the image processing apparatus 1. Further, the input tone correction section 12 converts RGB density signals into Cin, Min, and Yin signals (signals indicative of density levels) by complementary color transformation. Further, the input tone correction section 12 performs an image quality adjusting process such as adjustment of a color balance, removal of page background density, and adjustment of contrast.

The segmentation process section 13 classifies each pixel in an input image into a text area (a black text area, a color text area), a halftone dot area, and a picture area. Further, the segmentation process section 13 classifies the text area into a high density area (black text/high density area) and a low density area (black text/low density area). Further, in accordance with results thus classified, the segmentation process section 13 generates a segmentation class signal, indicating which area a pixel belongs to, and outputs the segmentation class signal thus generated to the black generation and under color removal section 15, the spatial filter process section 16, and the tone reproduction process section 18, while the segmentation process section 13 outputs input signals (Cin, Min, and Yin signals), as they are, inputted from the input tone correction section 12, to the color correction section 14 in a subsequent stage. A structure of the segmentation process section 13 will be explained later.

The color correction section 14 performs a process for removing color impurity which varies depending on spectral characteristics of CMY (cyan, magenta, and yellow) color materials including useless absorption components, thereby realizing a faithful color reproduction.

The black generation and under color removal section 15 performs a black generation process for generating a black (K) signal based on three-colored CMY signals which have been subjected to the color correction process, and performs a process for removing, from the original CMY signals, the K signal obtained in black generation so as to generate new CMY signals. Therefore, three-colored CMY signals inputted to the black generation and under color removal section 15 are converted into four-colored CMYK signals. Note that, a structure and a process of the black generation and under color removal process section 15 will be explained later, and in the present embodiment, the black generation and under color removal section 15 performs a black generation and under color removal process so that both of color fringing and a white spot can be reduced even when a chromatic aberration occurs in input image data.

Based on the segmentation class signal inputted from the segmentation process section 13, the spatial filter process section 16 performs, by use of a digital filter, a spatial filtering process with respect to image data indicated by the CMYK signals inputted from the black generation and under color removal section 15. This allows corrections of spatial frequency characteristics, thereby preventing blurs and/or deterioration in graininess of an output image. Based on the segmentation class signal inputted from the segmentation process section 13, the tone reproduction process section 18 performs a predetermined process with respect to image data indicated by the CMYK signals, just like the spatial filter process section 16.

For example, with respect to an area which has been classified into a text area by the segmentation process section 13, a sharpness enhancing process in a spatial filtering process is carried out by the spatial filter process section 16 so that high frequency components are more enhanced. This allows an enhancement in reproducibility of black texts (achromatic texts) or color texts (chromatic texts). At the same time, the tone reproduction process section 18 selects between a binary process and a multi-level dithering process in a high-resolution screen suitable for reproducing high frequency components.

Further, with respect to an area which has been classified into a halftone dot area by the segmentation process section 13, the spatial filter process section 16 performs a low-pass filtering process so as to remove input halftone dot components. Then, the output tone correction section 17 performs an output tone correction process for converting a signal such as a density signal into tone values which are characteristics of the image output apparatus 3. Thereafter, the tone reproduction process section 18 performs a tone reproduction process (halftone generation) for ultimately separating an image into pixels so as to reproduce a tone of each of the pixels.

With respect to an area which has been classified into a picture area by the segmentation process section 13, a binary process or a multi-level dithering process is performed in a screen which puts a high value on tone reproducibility.

Image data which has been subjected to the above processes is temporarily stored in storage means (not shown) and is read out from the storage means at a predetermined timing so as to be inputted to the image output apparatus 3. Note that, the above processes are controlled by the control section (not shown).

(1.3 Structure of Segmentation Process Section 13)

Figure 2:
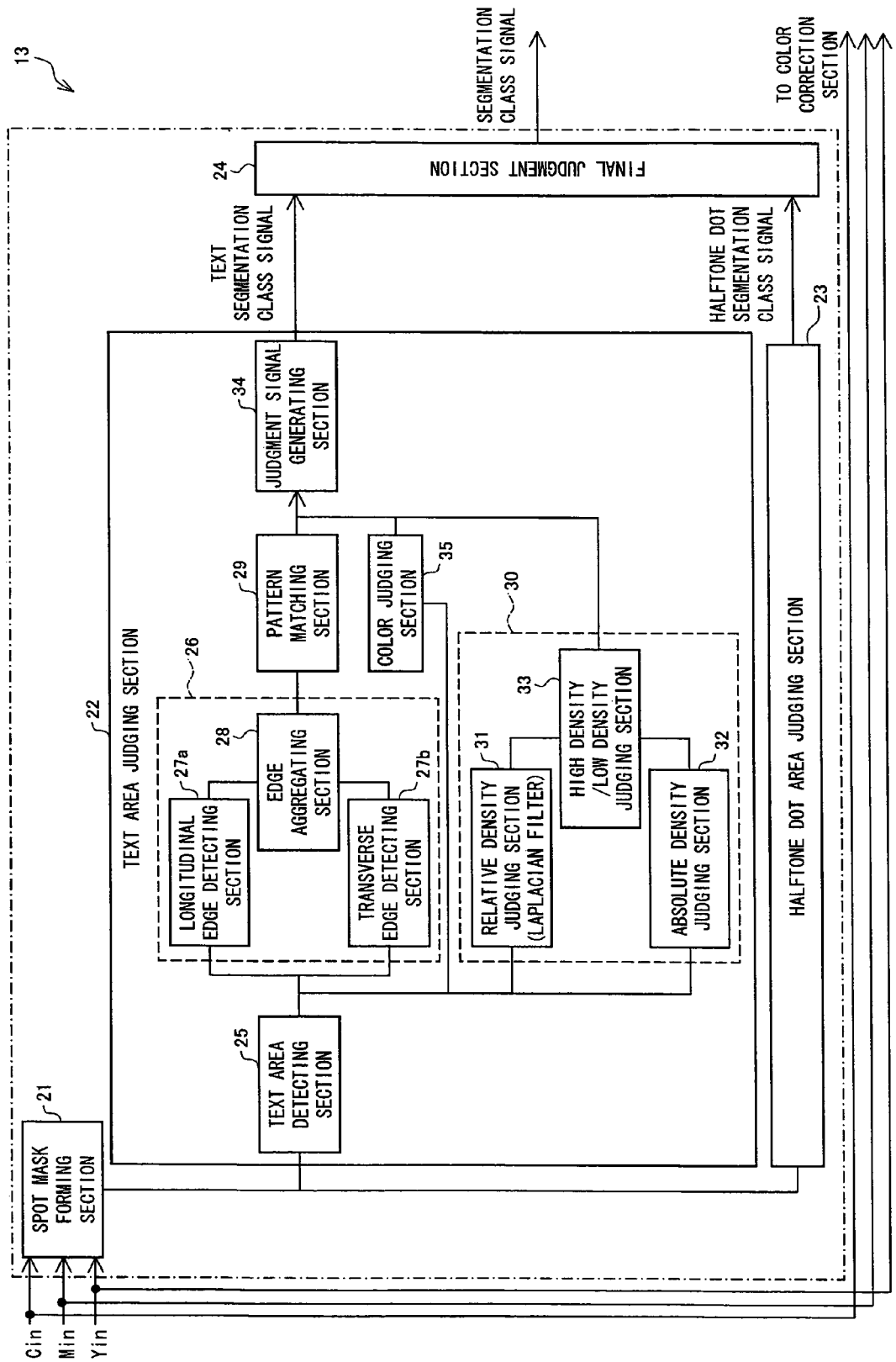
FIG. 2 is a block diagram illustrating a structure of a segmentation process section included in the image processing apparatus illustrated in FIG. 1.

The following explains an example of the segmentation process section 13. FIG. 2 is a block diagram illustrating a structure of the segmentation process section 13. Note that, in the present embodiment, an explanation is made as to a case of using substantially the same method for segmentation as the method described in Document 3. However, the method for segmentation is not particularly limited.

As illustrated in FIG. 2, the segmentation process section 13 includes a spot mask forming section 21, a text area judging section 22, a halftone dot area judging section 23, and a final judgment section 24.

Figure 3:
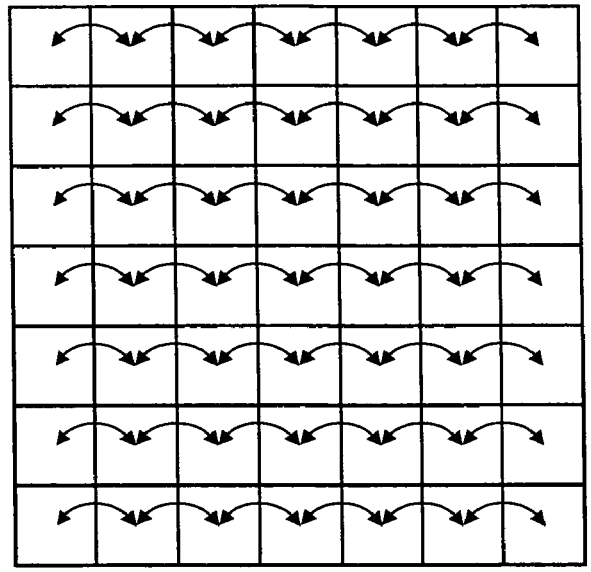
FIGS. 3(a) and 3(b) are explanatory drawings illustrating an example of a spot mask formed by a spot mask forming section included in the segmentation process section illustrated in FIG. 2.
Figure 3:
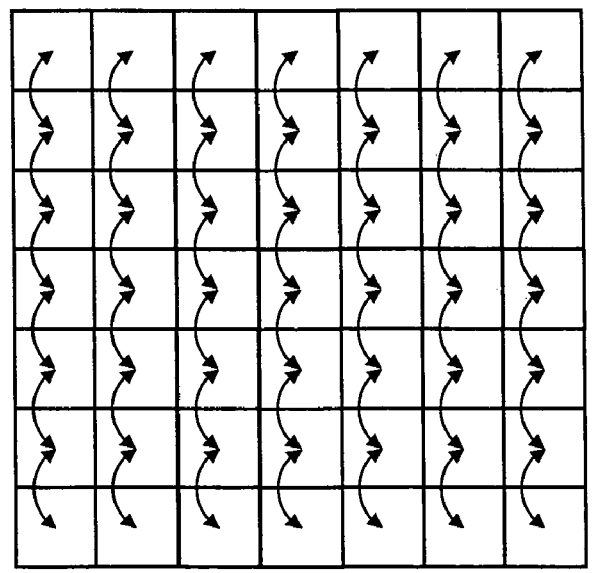

The spot mask forming section 21 forms a spot mask centering a current pixel with respect to input signals (Cin, Min, and Yin signals (data obtained by complementary color transformation)) inputted from the input tone correction section 12, and supplies the formed spot mask to the text area judging section 22 and the halftone dot area judging section 23. For example, as illustrated in FIG. 3, the spot mask forming section 21 forms a spot mask having 7×7 pixels and centering a current pixel.

The text area judging section 22 includes a text area detecting section 25, an edge detecting section 26, a color judging section 35, a pattern matching section 29, a high density area/low density area extracting section 30, and a judgment signal generating section 34.

The text area detecting section (text area extracting section) 25 extracts (discriminates) an area having characteristics of a text, and supplies results thus extracted to the edge detecting section 26, the color judging section 35, and the high density area/low density area extracting section 30. A method for extracting a text area is not particularly limited. For example, considering that a text area has a large difference between a maximum signal level and a minimum signal level and has high density, the method is performed as follows.

Namely, an area which satisfies Equation (1) as indicated below is extracted as a text area.

$$\text{Dmax} > \text{PA, and Dsub} > \text{PC or Dmin} < \text{PB} \tag{1}$$

Here, Dmax is a maximum signal level in a block having M×N pixels (M and N are natural numbers. e.g. 7×7 pixels) and centering a current pixel. Dmin is a minimum signal level in the block. Dsub is a difference between the maximum signal level and the minimum signal level in the block. Further, PA, PB, and PC are predetermined constant values.

The edge detecting section 26 includes a longitudinal edge detecting section 27a, a transverse edge detecting section 27b, and an edge aggregating section 28. As illustrated in FIG. 3(*b*), the longitudinal edge detecting section 27a obtains a difference between pixels which are adjacent in a longitudinal direction (a first direction) in a spot mask having M×N (e.g. 7×7) pixels and centering a current pixel, and performs a threshold value process with respect to the difference so as to detect an edge (when the difference is not less than the threshold value, the pixel is classified as an edge). As illustrated in FIG. 3(*a*), the transverse edge detecting section 27b obtains a difference between pixels adjacent in a transverse direction (a second direction perpendicular to the first direction) in a spot mask having M×N (e.g. 7×7) pixels and centering a current pixel, and performs a threshold value process with respect to the difference so as to detect an edge. Further, the edge aggregating section 28 outputs, as a result of detecting edges, a logical sum of results of detecting edges in the longitudinal and transverse directions (a result of aggregating results of detecting edges in the longitudinal and transverse directions) to the pattern matching section 29.

Figure 4:
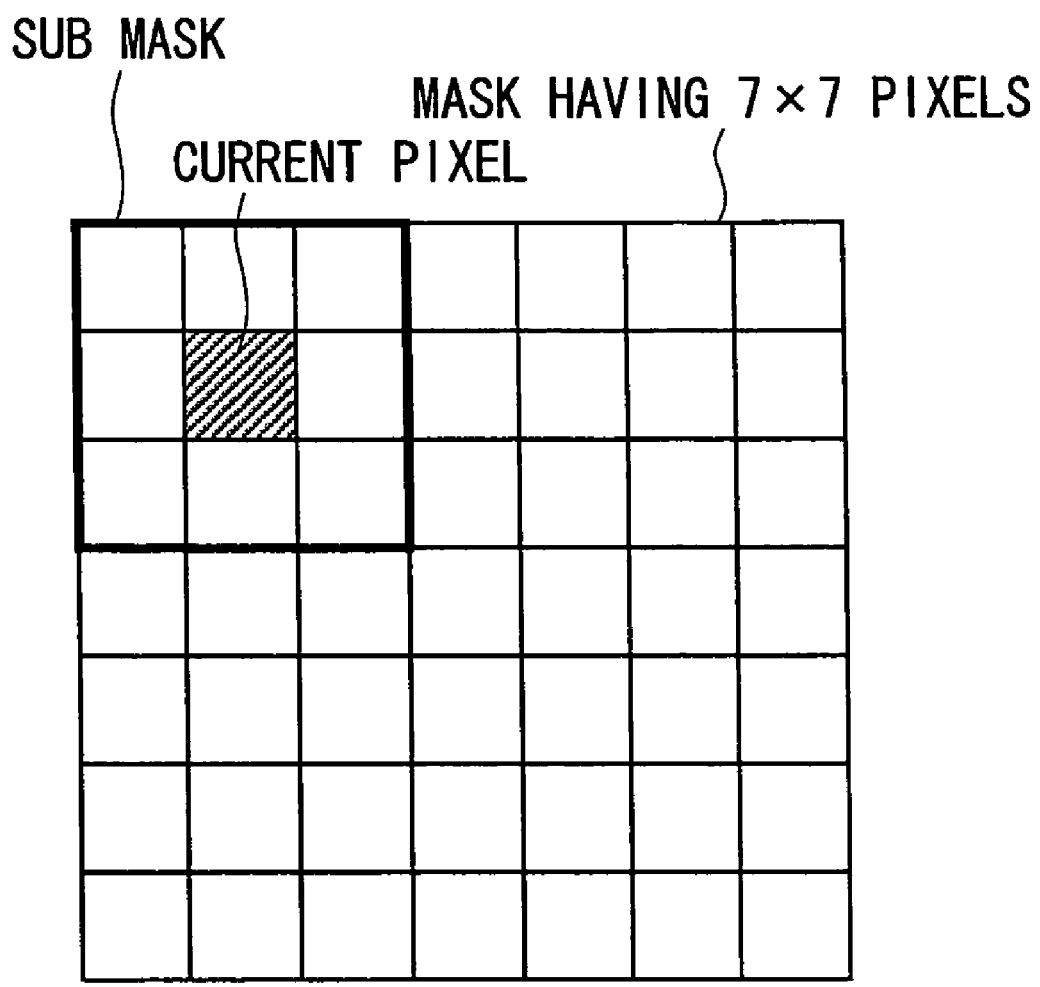
FIG. 4 is an explanatory drawing illustrating a pattern matching process performed by a pattern matching section included in the segmentation process section illustrated in FIG. 2.
Figures 5, 6:
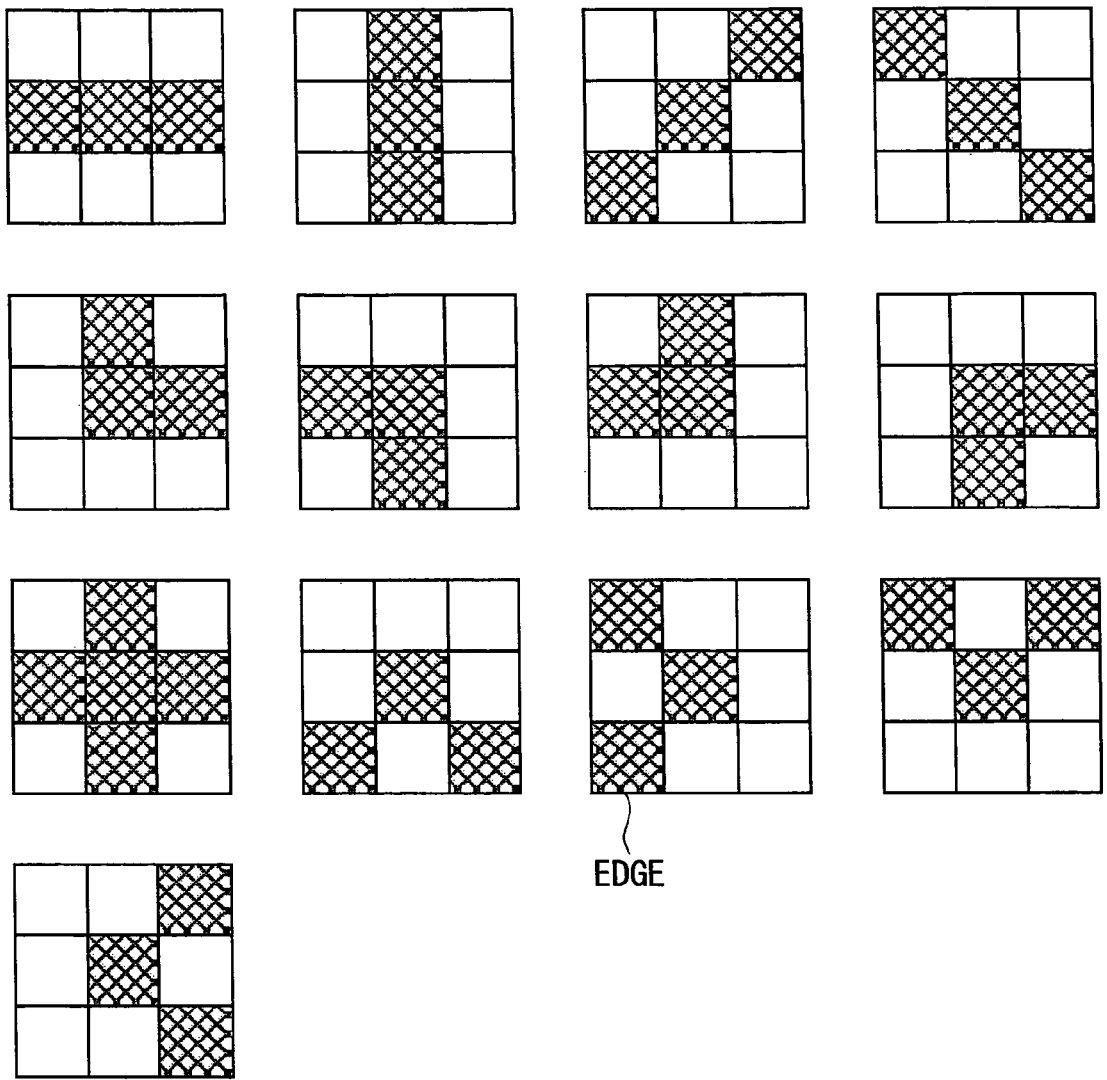
FIG. 5 is an explanatory drawing illustrating an example of a template used in the pattern matching process illustrated in FIG. 4.
FIG. 6 is an explanatory drawing illustrating an example of a filter coefficient in a Laplacian filter process performed by a relative density judging section illustrated in FIG. 2.

The pattern matching section 29 performs a pattern matching process with respect to the result of detecting edges carried out by the edge detecting section 26, and outputs the result of the pattern matching process to the judgment signal generating section 34. To be specific, as illustrated in FIG. 4, for example, a sub mask having 3×3 pixels is formed in a mask having 7×7 pixels, and the sub mask having 3×3 pixels is caused to move by 1 pixel in the mask having 7×7 pixels, thereby scanning a whole of the mask 7×7 pixels. When a pattern identical with a template (pattern which is prepared for detecting texts) illustrated in FIG. 5 is detected, it is judged that a current pixel under a process belongs to a text area.

The color judging section 35 judges a color of the current pixel (whether the color is a chromatic color or an achromatic color), and outputs the result of the judgment to the judgment signal generating section 34. For example, when a difference between a maximum value and a minimum value of Cin, Min, and Yin signals of a current pixel are not less than a predetermined threshold value, it is judged that the color is chromatic (chromatic color). When the difference is less than the predetermined threshold value, it is judged that the color is achromatic (achromatic color).

The high density area/low density area extracting section (density extracting section) 30 includes a relative density judging section 31, an absolute density judging section 32, and a high density/low density judging section 33.

The relative density judging section 31 performs a Laplacian filter process (see FIG. 6 for a filter coefficient) with respect to a spot area centering a current pixel, and judges whether the current pixel has high density or low density, by using such a characteristic that when density of a centering pixel is lower than density of its periphery (vicinity of the centering pixel), a signal value of the spot area having been subjected to the Laplacian filter process is a negative value, whereas when density of the centering pixel is higher than density of its periphery (vicinity of the centering pixel), the signal value of the spot area having been subjected to the Laplacian filter process is a positive value. Namely, it is judged whether the current pixel has high density or low density by performing a threshold value process with respect to a filter value obtained by assigning a filter coefficient in FIG. 6 to a spot mask centering the current pixel.

The absolute density judging section 32 compares density of the current pixel with a predetermined threshold value so as to judge whether the current pixel belongs to a high density part or a low density part.

When at least one of the relative density judging section 31 and the absolute density judging section 32 outputs a signal indicating that the current pixel to be judged belongs to a high density part, the high density/low density judging section 33 judges that the current pixel has high density.

However, judgment of the high density/low density judging section 33 is not limited to this. For example, the judgment may be arranged so that: when both of the relative density judging section 31 and the absolute density judging section 32 output a signal indicating that the current pixel to be judged has high density, the high density/low density judging section 33 judges that the current pixel belongs to a high density part. Further, in the present embodiment, the high density area/low density area extracting section 30 is arranged so as to include the relative density judging section 31, the absolute density judging section 32, and the high density/low density judging section 33. However, the high density area/low density area extracting section 30 is not limited to this arrangement. Alternatively, the high density area/low density area extracting section 30 is arranged so as to include one of the relative density judging section 31 and the absolute density judging section 32 without including the high density/low density judging section 33. Further, when a text area is not classified as a high density area and a low density area, the high density area/low density area extracting section 30 may be omitted.

The judgment signal generating section 34 generates a judgment signal (text segmentation class signal) illustrated in Table 2 as indicated below, based on: the result of judgment (output signal) carried out by the edge detecting section 26 and the pattern matching section 29; the result of judgment carried out by the color judging section 35; and the result of judgment carried out by the high density/low density judging section 33, namely, based on the result of judgment of a text area, the result of judgment of a color, and the result of judgment of a high density area/low density area. Then, the judgment signal generating section 34 outputs the judgment signal to the final judgment section 24. Note that, "-" in Table 2 indicates that a result of judgment may be either one.

TABLE 2

| Result of text area judgment | Result of color judgment | Result of high density/low density judgment | Judgment signal |
|---|---|---|---|
| Text area | Achromatic | High density | Black text area/high density |
| Text area | Achromatic | Low density | Black text area/low density |
| Text area | Chromatic | — | Color text area |
| Other than text area | — | — | Other than text area |

Namely, the judgment signal generating section 34 judges that a pixel judged not to be an edge by the edge detecting section 26 and a pixel whose pattern is not identical with a template in the pattern matching section 29 belongs to an area other than a text area, and the judgment signal generating section 34 generates a judgment signal indicative of an area other than a text area. Further, with respect to a pixel which is judged to be an edge by the edge detecting section 26 and whose pattern is identical with a template in the pattern matching section 29 (a pixel judged to belong to a text area), the judgment signal generating section 34 judges whether the pixel belongs to a high density area (black text/high density area), a low density area (black text/low density area), or a color text area (chromatic text area), and the judgment signal generating section 34 generates a judgment signal indicating which area the pixel belongs to.

The halftone dot area judging section 23 performs the following judgment with respect to a block having M×N (M and N are natural numbers) pixels and centering a current pixel, which block is inputted from the spot mask forming section 21. The halftone dot area judging section 23 outputs a judgment signal (halftone dot segmentation class signal) indicative of a result of the judgment to the final judgment section 24. Namely, an average signal level Dave is calculated for each pixel in the block, and each pixel in the block is binarized by using the average value. Further, a maximum pixel signal level Dmax and a minimum pixel signal level Dmin are calculated at the same time. A halftone dot area is discriminated by use of halftone dot's characteristics such that an image signal greatly varies in a small area and a halftone dot area has higher density than a background. The number of density transition from 0 to 1 and the number of density transition from 1 to 0 are calculated in a main scanning direction and a sub scanning direction with respect to binazrized data, and a sum of the number of density transition from 0 to 1 and the number of density transition from 1 to 0 in the main scanning direction is regarded as KH and a sum of the number of density transition from 0 to 1 and the number of density transition from 1 to 0 in the sub scanning direction is regarded as KV. When KH and KV are higher than threshold values TH and TV, respectively, the block is regarded as a halftone dot area. Further, in order to prevent the area from being wrongly judged to be a background, Dmax, Dmin, and Dave which have been calculated above are compared with threshold values B1 and B2. Namely, if a value obtained by subtracting the average signal level Dave from the maximum pixel signal level Dmax is larger than the threshold value B1 (Dmax−Dave>B1), a value obtained by subtracting the minimum pixel signal level Dmin from the average signal level Dave is larger than the threshold value B2 (Dave−Dmin>B2), KH>TH, and KV>TV, then the block is judged to be a halftone dot area. Otherwise, the block is judged to be a non-halftone dot area.

The final judgment section 24 generates a segmentation class signal on the basis of the result of the judgment carried out by the text area judging section 22 and the halftone dot area judging section 23, and outputs the segmentation class signal to the black generation and under color removal section 15, the spatial filter process section 16, and the tone reproduction process section 18. To be specific, if the final judgment section 24 receives, from the text area judging section 22, a judgment signal indicative of a pixel belonging to any one of a black text/high density area, a black text/low density area, and a color text area, then the final judgment section 24 outputs the judgment signal. If the final judgment section 24 receives, from the text area judging section 22, a judgment signal (segmentation class signal) indicative of a pixel belonging to an area other than a text area, then the final judgment section 24 judges whether the pixel belongs to a halftone dot area or not based on an input signal from the halftone dot area judging section 23. Then, if the pixel belongs to a halftone dot area, then the final judgment section 24 outputs a judgment signal indicative thereof. If the pixel does not belong to a halftone dot area, namely, if the pixel belongs to neither a text area nor a halftone dot area, then the final judgment section 24 judges that the pixel belongs to other (picture) area and outputs a judgment signal indicative thereof. Further, if the final judgment section 24 receives, from the text area judging section 22, a judgment signal indicative of a pixel belonging to any one of a black text/high density area, a black text/low density area, and a color text area, and receives, from the halftone dot area judging section 23, a judgment signal indicative of a pixel belonging to a halftone dot area, then the final judgment section 24 judges that characteristics of a halftone dot area are detected and outputs a judgment signal indicative of a pixel belonging to a halftone dot area.

(1.4 Structure of Black Generation and Under Color Removal Section 15)

Figure 7:
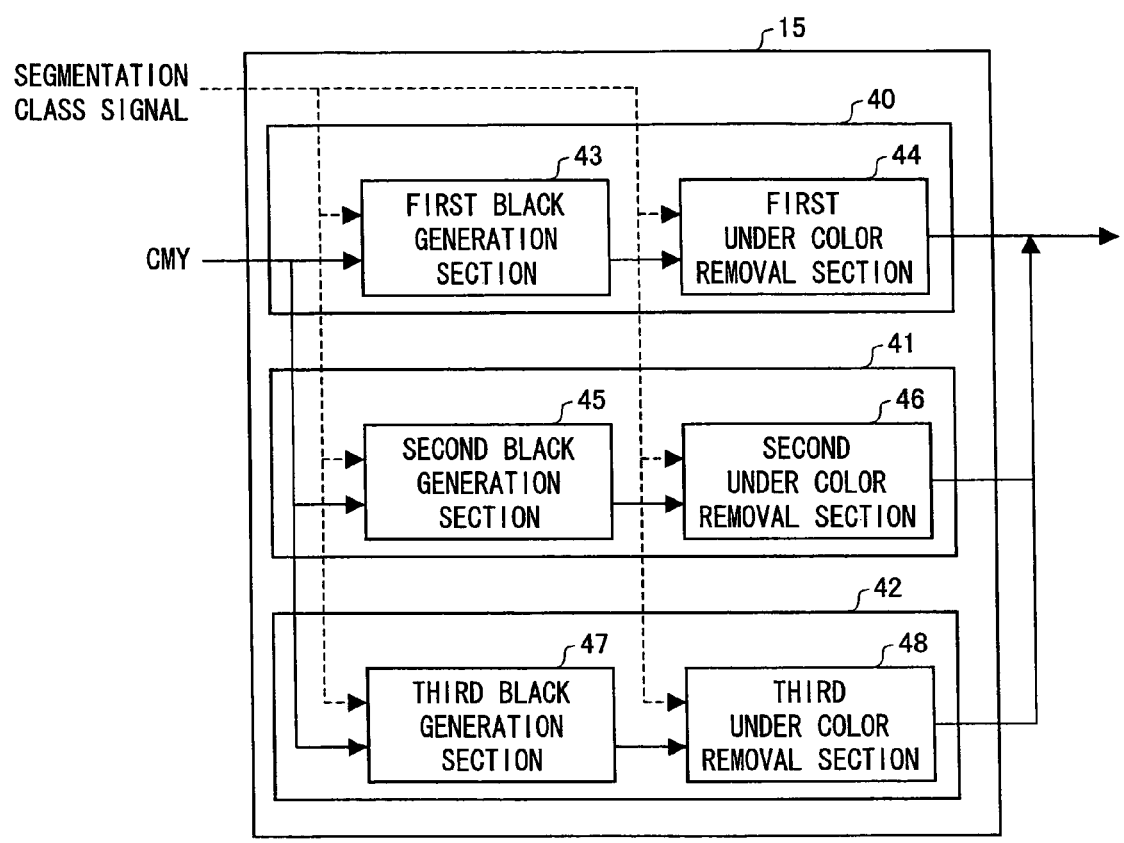
FIG. 7 is a block diagram illustrating a structure of a black generation and under color removal section included in the image processing apparatus illustrated in FIG. 1.

The following explains a structure of the black generation and under color removal section 15. FIG. 7 is a block diagram illustrating the structure of the black generation and under color removal section 15. As illustrated in FIG. 7, the black generation and under color removal section 15 includes: a first black generation and under color removal section 40 including a first black generation section 43 and a first under color removal section 44; a second black generation and under color removal section 41 including a second black generation section 45 and a second under color removal section 46; and a third black generation and under color removal section 42 including a third black generation section 47 and a third under color removal section 48.

When the first black generation and under color removal section 40 receives, from the segmentation process section 13, a segmentation class signal indicative of a pixel which belongs to a black text/high density signal, the first black generation and under color removal section 40 performs a black generation and under color removal process with respect to a signal of the pixel.

When the second black generation and under color removal section 41 receives, from the segmentation process section 13, a segmentation class signal indicative of a pixel which belongs to a black text/low density area, the second black generation and under color removal section 41 performs a black generation and under color removal process with respect to a signal of the pixel.

When the third black generation and under color removal section 42 receives, from the segmentation process section 13, a segmentation class signal indicative of a pixel which belongs to an area other than a text area (a black text area), the third black generation and under color removal section 42 performs a black generation and under color removal process with respect to a signal of the pixel.

The first black generation and under color removal section 40 and the third black generation and under color removal section 42 perform a black generation and under color removal process through a method (general method) for generating black based on the skeleton black. According to the method, the black generation and under color removal process is performed in accordance with Equation (1) as indicated below. In the Equation (1), y=f (x) indicates an input/output characteristic of a skeleton curve, C, M, and Y indicate input data, C', M', Y', and K' indicate output data, and $\alpha$ (0<$\alpha$<1) indicate UCR (Under Color Removal) ratio.

$$K'=f\{min(C,M,Y)\}$$

$$C'=C-\alpha K'$$

$$M'=M-\alpha K'$$

$$Y'=Y-\alpha K' \quad (1)$$

Namely, the first black generation section 43 and the third black generation section 47 generate black on the basis of a minimum value out of inputted CMY signals. Then, by subtracting a product of a value of a generated black (K') signal and a UCR ratio $\alpha$ from values of input data C, M, and Y, output data C', M', and Y' are generated and outputted.

Note that, the method through which the first black generation and under color removal section 40 and the third black generation and under color removal section 42 perform a black generation and under color removal process is not particularly limited. The method may be any one of conventional and well known methods. Further, the black generation and under color removal process carried out by the first black generation and under color removal section 40 may be arranged so that an amount of black generation and an amount of under color removal (under color removal value) are set higher than those in the black generation and under color removal process carried out by the third black generation and under color removal section 42, thereby realizing sharper display of texts. Further, in a case where the black generation and under color removal process is not switched according to a black text/high density area and a black text/low density area, the first black generation and under color removal section 40 may be used also as the second black generation and under color removal section 41 which will be mentioned later.

When the second black generation and under color removal section 41 receives, from the segmentation process section 13, a segmentation class signal indicative of a pixel which belongs to a black text/low density area, the second black generation section 45 sets an amount of black generation to be smaller than a general amount (for example, an amount of black generation carried out by the first black generation section 43 or the third black generation section 48). For example, black generation is performed based on a product of a minimum value of inputted C, M, and Y signals and a constant value less than 1. Alternatively, an amount of black generation may be set to be substantially the same as a general amount.

The second under color removal section 46 calculates a middle value mid of inputted C, M, and Y signals (a value positioned at the middle of C, M, and Y signals when the signals are disposed in the order of their sizes), determines U indicative of a UCR amount (an amount of under color removal) on the basis of the middle value mid, and subtracts the UCR amount from the inputted C, M, and Y signals, thereby performing an under color removal process. Namely, the UCR amount is determined by use of Equation (2) as indicated below.

$$U=mid(C,M,Y)$$

$$C'=C-U$$

$$M'=M-U$$

$$Y'=Y-U \quad (2)$$

(1.5 Flows of Segmentation Process and Black Generation and Under Color Removal Process)

Figure 8:
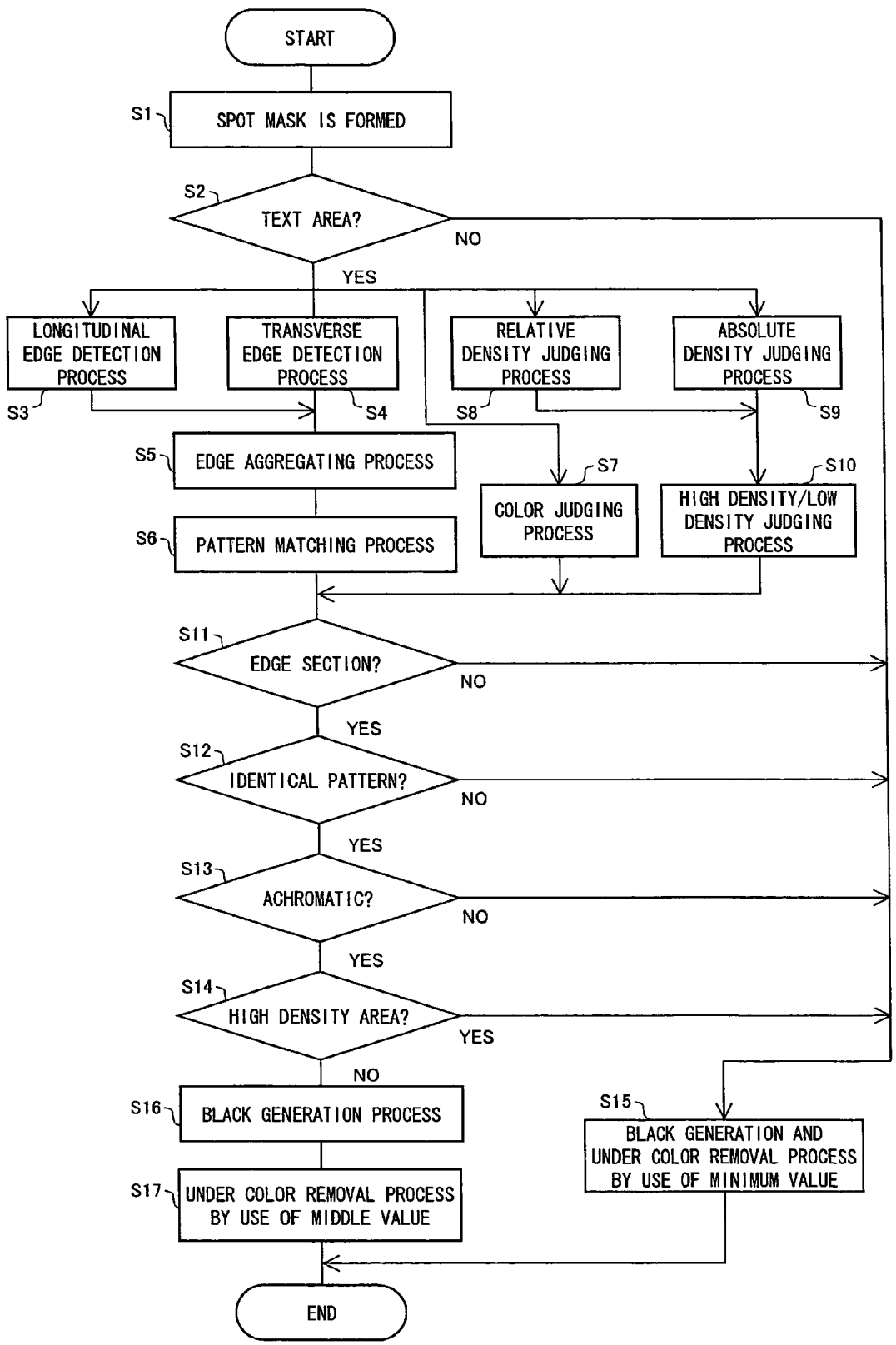
FIG. 8 is a flow chart illustrating a flow of a segmentation process and a black generation and under color removal process in the image processing apparatus illustrated in FIG. 1.

With reference to a flow chart illustrated in FIG. 8, the following explains flows of a segmentation process and a black generation and under color removal process in the image processing apparatus 1.

When Cin, Min, and Yin signals are inputted from the input tone correction section 12 to the segmentation process section 13, the spot mask forming section 21 forms a spot mask centering a current pixel and supplies the spot mask to the text area judging section 22 and the halftone dot area judging section 23 (S1). Note that, the following explanation will omit a process carried out by the halftone dot area judging section 23.

When the signal is inputted from the spot mask forming section 21 to the text area judging section 22, the text area judging section 22 extracts (discriminates) an area having characteristics of a text and judges whether the current pixel belongs to a text area or not (S2). If the text area judging section 22 judges that the current pixel does not belong to a text area, later-mentioned step S15 is performed.

On the other hand, if the text area judging section 22 judges in S2 that the current pixel belongs to a text area, the text area judging section 22 supplies the signal from the spot mask forming section 21 to the longitudinal edge detecting section 27a, the transverse edge detecting section 27b, the color judging section 35, the relative density judging section 31, and the absolute density judging section 32.

Thereafter, the longitudinal edge detecting section 27a performs a longitudinal edge detecting process (S3), and the transverse edge detecting section 27b performs a transverse edge detecting process (S4). Further, the edge aggregating section 28 aggregates a result of detection carried out by the longitudinal edge detecting section 27a with respect to a longitudinal edge and a result of detection carried out by the transverse edge detecting section 27b with respect to a transverse edge, and outputs the result thus aggregated to the pattern matching section 29 (S5). The pattern matching section 29 performs a pattern matching process with respect to the result of detecting edges by the edge detecting section 26, and outputs the result of the pattern matching process to the judgment signal generating section 34 (S6).

Further, the color judging section 35 judges whether the current pixel is chromatic or achromatic (color judging process) and supplies the result of the judgment to the judgment signal generating section 34 (S7).

Further, in the high density area/low density area extracting section 30, based on the signal inputted from the text area judging section 22, the relative density judging section 31 performs a relative density judging process (S8) and the absolute density judging section 32 performs an absolute density judging process (S9). Then, the relative density judging section 31 and the absolute density judging section 32 supply results of the judgment to the high density/low density judging section 33.

The high density/low density judging section 33 judges whether the current pixel belongs to a high density area or a low density area on the basis of the results of the judgment carried out by the relative density judging section 31 and the absolute density judging section 32, and supplies a result of the judgment to the judgment signal generating section 34 (S10).

The judgment signal generating section 34 judges, based on a signal from the edge detecting section 26, whether the current pixel belongs to an edge section or not (S11), judges, based on a signal from the pattern matching section 29, whether a pattern of peripheral pixels around the current pixel is identical with a template (S12), judges whether the current pixel is chromatic or achromatic (S13), and judges whether the current pixel belongs to a high density area or a low density area (S14), and supplies signals indicative of results of the judgments to the black generation and under color removal section 15 via the final judgment section 24.

If it is judged in S11 that the current pixel does not belong to the edge section, or if it is judged in S12 that the pattern of the pixels around the current pixel is not identical with the template, or if it is judged in S13 that the current pixel is chromatic, or if it is judged in S14 that the current pixel belongs to the high density area, then the black generation and under color removal section 15 performs a general black generation and under color removal process (for example, a black generation and under color removal process in which a minimum value min (C, M, Y) of input signals is used) (S15).

On the other hand, if it is judged in S11 that the current pixel belongs to the edge section, and if it is judged in S12 that the pattern of the pixels around the current pixel is identical with the template, and if it is judged in S13 that the current pixel is achromatic, and if it is judged in S14 that the current pixel belongs to the low density area, then the black generation and under color removal section 15 (second black generation section 45) performs a black generation process through a predetermined method (S16). A method for the black generation process here is not particularly limited. For example, an amount of black generation is set to be smaller than a general amount (e.g. an amount in the black generation process in S15).

Then, the black generation and under color removal section 15 (second under color removal section 46) determines a UCR amount on the basis of a middle value mid (C, M, Y) of input signals and performs an under color removal process (S17).

(1.6 Operation of Image Processing Apparatus 1)

As described above, the image processing apparatus 1 performs an under color removal process with respect to a pixel judged to be a black text/low density area (an edge of a text or a line), by using a middle value mid (C, M, Y) of inputted C, M, and Y signals as a UCR amount. Consequently, it is possible not only to reduce color fringing in an edge of a text or a line but also to reduce a white spot.

Figure 9:
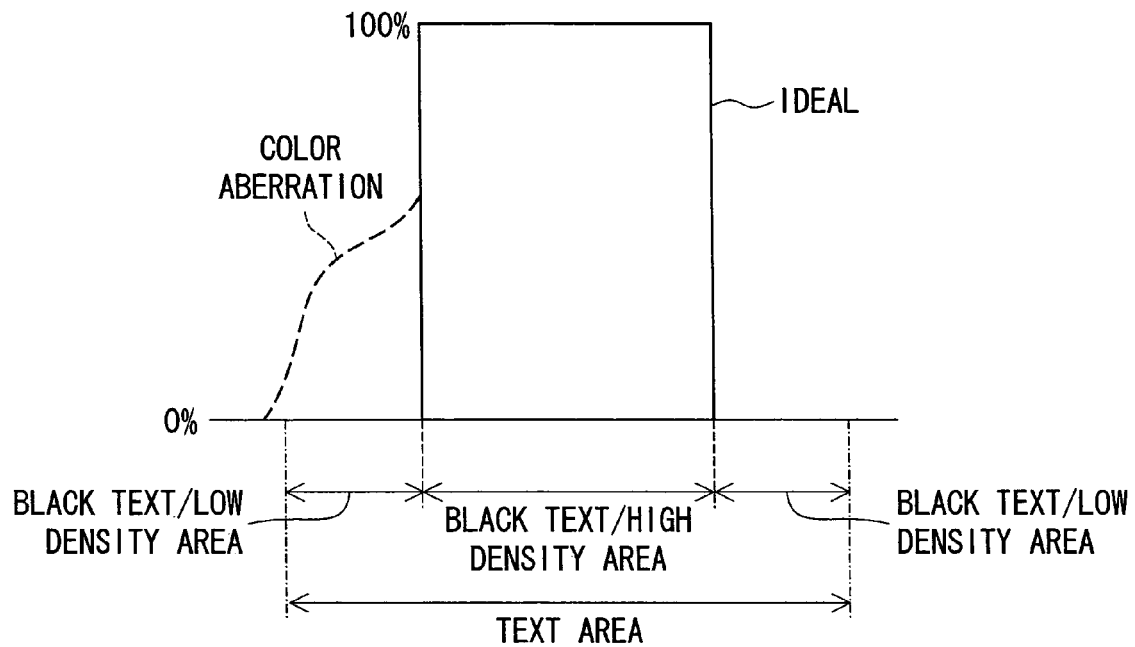
FIG. 9 is a graph illustrating examples of a density level of black in a text area (black text area) in a case where chromatic aberration occurs and in a case where chromatic aberration does not occur.

The following further details why such an effect can be obtained. FIG. 9 is a graph illustrating an example of a density level of black in a text area (black text area). As illustrated in FIG. 9, a text area with respect to which an image process is performed includes not only a text or a line (black text/high density area) but also an area adjacent to the text or the line (area including an edge of the text or the line. A black text/low density area).

In a case where chromatic aberration does not occur (ideal case), as indicated by a full line, a black text/low density area has 0% of black density. On the other hand, in a case where chromatic aberration occurs, as indicated by a broken line, the black text/low density area has color aberration.

Figure 10:
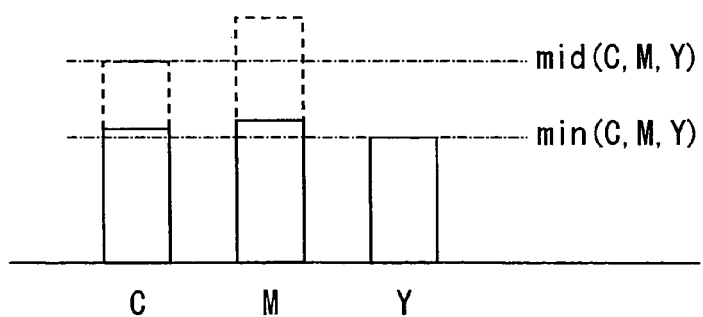
FIG. 10 is a graph illustrating an example of respective signal levels of a C signal, an M signal, and a Y signal in a black text/low density area.

FIG. 10 is a graph illustrating an example of signal levels (density levels) of C, M, and Y signals in a black text/low density area. In a case where chromatic aberration does not occur (full line in FIG. 10), signal levels of C, M, and Y signals are substantially the same with one another. However, in a case where chromatic aberration occurs, signal levels of C, M, and Y signals are unbalanced (broken line in FIG. 10).

In a conventional and general method, a UCR amount is set to α×min (C, M, Y), 0<α<1. Consequently, color components (C and M in FIG. 10) other than the color component having the minimum value remain, so that color fringing occurs. Namely, a conventional method in which an amount of black generation and a UCR amount are determined based on a minimum value is designed for replacement by black while keeping original color components and original hues as much as possible. Therefore, though a white spot (color omission) does not occur around a text on a halftone dot or a text on a color page background, in a case where chromatic aberration occurs in reading a document by a scanner or the like, hues of input signals are faithfully reproduced, which reproduces color aberration in a reproduced image.

Further, the technique of Document 1 is such that: a color fringing area is discriminated and an amount of black generation for a pixel in the color fringing area is determined on the basis of an average value between a maximum value and a minimum value of image data having a plurality of color components (CMY). However, in a current technical standard, it is impossible to keep enough accuracy in discriminating color fringing, so that it is difficult to overcome color fringing.

Further, in the technique of Document 2, a black text/low density area is represented only by black color, so that color fringing does not occur. However, even when a chromatic component really exists in the area, the black text/low density area is represented only by black color, so that a white spot is produced. Namely, the technique of Document 2 is designed for completely removing color components (C=M=Y=0), and therefore color components are not produced even when chromatic aberration occurs in reading a document and color components are produced in input values. However, color components are also removed around a text on a color page background or a text on halftone dots, so that a white spot is produced.

Therefore, in the conventional techniques, it is impossible to overcome both of color fringing and a white spot even when parameters and settings are adjusted.

On the other hand, in the image processing apparatus 1, a UCR amount in a black text/low density area is set to a middle value of C, M, and Y signals (mid (C, M, Y)), so that it is possible to increase the UCR amount compared with a conventional case in which a UCR amount is set to α×min (C, M, Y). Consequently, it is possible to reduce color fringing.

Figure 11:
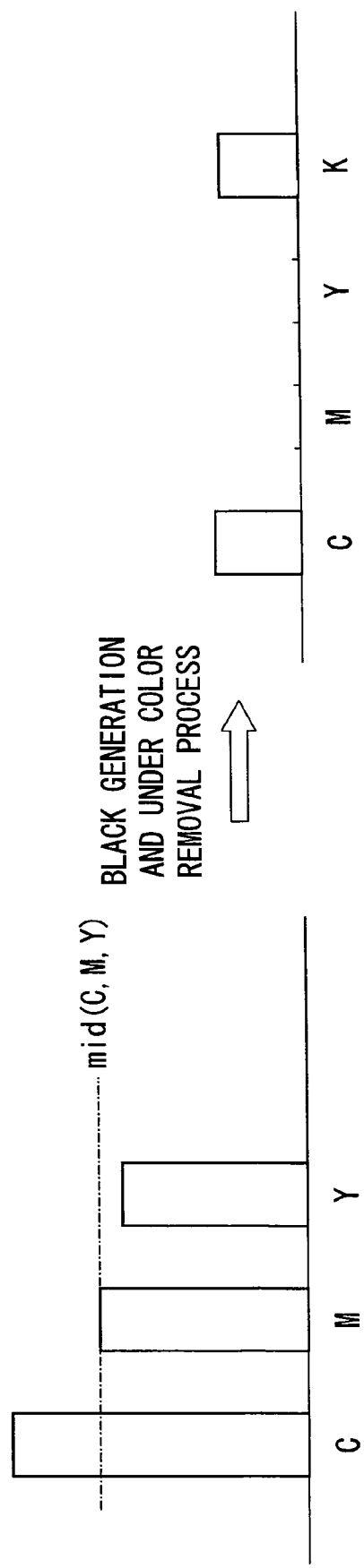
FIG. 11 is a graph illustrating an example of respective signal levels of a C signal, an M signal, and a Y signal in a black text/low density area formed on a colored page background.

Further, in a case of a black text/low density area formed on a color page background (on a paper having a chromatic color or on a halftone dot area), a color component of a page background can be kept, so that it is possible to prevent a white spot. For example, in a black text/low density area on a blue page background, as illustrated in FIG. 11, under color is removed while a UCR amount is mid (C, M, Y), so that much of a color component of C remains. Consequently, it is possible to prevent a white spot on the black text/low density area. Namely, in the image processing apparatus 1, under color can be removed while hue is kept to some extent, so that it is possible not only to remove much of color components due to chromatic aberration but also to keep much of a color component of a text on a color page background (a text on a color paper, a text on halftone dots, and the like).

(1.7 Variation Example of Image Processing Apparatus 1)

In the present embodiment, the second under color removal section 46 determines a UCR amount on the basis of U=mid (C, M, Y). Alternatively, the present embodiment may adopt any method as long as the method can determine a UCR amount so that U>min (C, M, Y) and U<max (C, M, Y).

For example, a UCR amount may be determined by use of Equation (3) as indicated below.

$$U=g(x)$$

$$C'=C-U$$

$$M'=M-U$$

$$Y'=Y-U \quad (3)$$

Here, g(x) may be any function. For example, g(x) may be a function which calculates a UCR amount on the basis of a middle value mid (C, M, Y) of inputted C, M, and Y signals (namely, g(x)=g{mid (C, M, Y)}).

Further, g(x) may be an average value ave (C, M, Y) of inputted C, M, and Y signals or may be a function which calculates a UCR amount on the basis of ave (C, M, Y) (g(x)=g{ave (C, M, Y)}).

Further, g(x) may be an average value (max+min)/2 which is an average value between a maximum value max (C, M, Y) of inputted C, M, and Y signals and a minimum value min (C, M, Y) of the inputted C, M, and Y signals. Alternatively, g(x) may be a function which calculates a UCR amount on the basis of (max+min)/2 (g(x)=g{(max+min)/2}).

Further, g(x) may be a function for determining a UCR amount so that U>min (C, M, Y) and U<max (C, M, Y), on the basis of a minimum value min (C, M, Y) or a maximum value max (C, M, Y) of inputted C, M, and Y signals. For example, g(x) may be a product of minimum value min (C, M, Y) of inputted C, M, and Y signals and a constant value larger than 1. Alternatively, g(x) may be a product of a maximum value max (C, M, Y) of inputted C, M, and Y signals and a constant value less than 1.

Further, g(x) may be a combination of the above functions.

Further, in a case where image data having a plurality of color components (CMY) has a minimum value and a middle value each of which is identical with each other (in a case where two colors of CMY have smaller values than the other one color, or in a case where three colors of CMY have an identical value), an under color removal process may be performed so that a predetermined value (a value ranging from 1 to 10 or so for example) is added to a middle value.

Further, in a case where image data having a plurality of color components (CMY) has a middle value and a maximum value each of which is identical with each other (in a case where two colors of CMY have larger values than the other value), an under color removal process may be performed so that a predetermined value (a value ranging from 1 to 10 or so for example) is subtracted from a middle value.

Note that, a function most appropriate for calculating a UCR amount is different according to a state of color fringing (whether color fringing is evident or slight) or an input image. Therefore, the present embodiment may be arranged so that: according to a state of color fringing or an input image, a user or selecting means provided in the image processing apparatus 1 (the selecting means is not shown. For example, the selecting means may be such that setting of ROM is changed by a dip switch or selection is made via the operation panel) selects a suitable function out of a plurality of functions or uses a combination of the plurality of functions. For example, the present embodiment may be arranged so that the user or the selecting means provided in the image processing apparatus 1 selects the most appropriate function on the basis of conditions such as the type of an input image, the type of a document read out by an image reading apparatus (whether the document has a white page background or a color page background (color paper, a paper on which a halftone dot image is formed, or the like)), and the degree of vibration at a time when the image input apparatus 2 reads a document.

Further, g(x) may be such that output values are determined by referring to a look up table (storage section) in which output values corresponding to inputted C, M, and Y signals are stored on the basis of a result of calculation or a result of experiment for obtaining output values (UCR amount) with respect to inputted C, M, and Y signals. Note that, the look up table may be such that inputted C, M, and Y signals themselves correspond to output values or may be such that values calculated based on inputted C, M, and Y signals (such as (max+min)/2 and min (C, M, Y)) correspond to output values.

Further, in the present embodiment, a text area is further classified as a high density area and a low density area, and a UCR amount of each pixel in the low density area is set to be larger than min (C, M, Y). However, the present embodiment is not limited to this. For example, the present embodiment may be arranged so that: a text area is not classified as a high density area and a low density area, and a UCR amount is set to be larger than min (C, M, Y) and smaller than max (C, M, Y) with respect to each pixel of a whole text area. Further, the present embodiment may be arranged so that: a text area is not classified as a high density area and a low density area, and a UCR amount is set to be larger than min (C, M, Y) and smaller than max (C, M, Y) with respect to a pixel judged to be an edge of a text or a line (a pixel judged by the edge detecting section 26 to be an edge of a text or a line and/or a pixel judged by the pattern matching section 29 to belong to a pattern identical with a template).

Further, in the present embodiment, a segmentation process is performed with respect to each pixel. Alternatively, the present embodiment may be arranged so that a segmentation process is performed with respect to each block having a plurality of pixels, and based on the result, it is judged which area each pixel belongs to.

Further, in the present embodiment, an explanation is made as to an image processing apparatus which outputs image data having CMYK. Alternatively, the present invention may be applicable to an image processing apparatus which outputs image data having more than four color components (including black).

(1.8 Example of Image Processing Program)

Each block in the image processing apparatus 1 of the present embodiment may be processed by use of software (application program (image processing program)). For example, a printer driver may be provided in a computer, the printer driver including software for realizing a process of the black generation and under color removal section 15 (alternatively, the black generation and under color removal section 15 and the segmentation process section 13).

FIG. 12 is a block diagram illustrating an example of a structure of a computer 60 which includes a printer driver 50 including software for realizing the process of the black generation and under color removal section 15. As illustrated in FIG. 12, the computer 60 includes the printer driver 50, a communication port driver 51, a communication port 52. The printer driver 50 includes a color correction section 14, a black generation and under color removal section 15, a tone reproduction process section 18, and a printer language translation section 53. Further, the computer 60 is connected with a printer (image output apparatus) 3 for outputting an image on the basis of image data inputted from the computer 60.

Image data which has been generated by causing the computer 60 to carry out various application programs or image data which has been inputted to the computer 60 is subjected to the above process in the color correction section 14, the black generation and under color removal section 15, and the tone reproduction process section 18. Image data having been subjected to the above process is converted by the printer language translation section 53 into a printer language and is inputted to a printer via the communication port driver 51 and the communication port 52 (such as RS232C and LAN). The printer 3 may be a digital multifunctional apparatus having a copy function and a facsimile function as well as a printer function. Further, the printer driver 50 may include a function for performing processes of the segmentation process section 13, the spatial filter process section 16, and the output tone correction section 17.

Further, each block of the image processing apparatus 1 of the above embodiments, particularly the black generation and under color removal section 15 and each block included therein may be realized by software by using a processor such as a CPU.

Namely, the image processing apparatus 1 includes: a CPU (central processing unit) for carrying out a command of a program for realizing functions; a ROM (read only memory) that stores the program; a RAM (random access memory) that develops the program; a storage device (storage medium) such as a memory for storing the program and various data; and the like. The object of the present invention can be realized in such a manner that the image processing apparatus is provided with a computer-readable storage medium for storing a program code (such as executable program, intermediate code program, and source program) of a control program (image processing program) of the image processing apparatus 1 which program serves as software for realizing the functions, and the computer (alternatively, CPU or MPU) reads out and executes the program code stored in the storage medium.

Such a storage medium may be a memory (e.g. ROM and RAM) included in a computer, which memory is program media. Alternatively, a program medium may be used which can be read by being inserted to a program reading device serving as an external storage device. In either of the cases, it is preferable if the contained program is accessible to a microprocessor which will execute the program. Further, it is preferable if the program is read, and the program is then downloaded to a program storage area (e.g. RAM) of a computer where the program is executed. At that time, it is preferable that the program for download is stored in a main body device in advance.

The storage medium is, for example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM. By storing the program in a storage medium which is detachable from a main body of a computer, it is possible to provide a portable storage medium which stores the image processing program of the present invention.

Further, the image processing apparatus 1 may be arranged so as to be connectable to a communication network so that the program code is supplied to the image processing apparatus 1 through the communication network. The communication network is not to be particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted. Note that, in a case of downloading a program from the communication network, a program for downloading the program may be stored in an image processing apparatus or a computer in advance, or may be installed from other storage medium.

Further, the present invention may be realized by a computer system which includes: an image input apparatus such as a flat bed scanner, a film scanner, and a digital camera; a computer for performing various processes such as the image processing method by downloading a predetermined program; an image display apparatus such as a CRT display and a liquid crystal display for displaying a result of a process carried out by the computer; and a printer for outputting the result of the process carried out by the computer onto a paper and the like. Further, the computer system may include a network card or a modem, each of which serves as communication means to be connected with a server or the like via a network.

In order to solve the problem, the image processing apparatus of the present invention is an image processing apparatus, which performs a black generation process and an under color removal process with respect to image data including a plurality of color components, comprising: a segmentation section for judging whether each pixel or each block including a plurality of pixels in the image data belongs to a black text area or not; and an under color removal section for performing the under color removal process with respect to the image data, the under color removal section performing the under color removal process so that an under color removal value for each pixel of at least a part of pixels judged by the segmentation section to belong to a black text area is larger than a minimum color component density level and smaller than a maximum color component density level of the pixel.

Further, in order to solve the problem, the image processing method of the present invention is an image processing method, in which a black generation process and an under color removal process are performed with respect to image data including a plurality of color components, comprising the steps of: (I) judging whether each pixel or each block including a plurality of pixels in the image data belongs to a black text area or not; and (II) performing the under color removal process with respect to the image data, in the step (II), an under color removal value for each pixel of at least a part of pixels judged in the step (I) to belong to a black text area being set to be larger than a minimum color component density level and smaller than a maximum color component density level of the pixel.

With the arrangement, the segmentation section judges whether each pixel or each block including a plurality of pixels in image data belongs to a black text area or not. Further, the under color removal section performs the under color removal process so that an under color removal value for each pixel of at least a part of pixels judged by the segmentation section to belong to the black text area is larger than a minimum color component density level and smaller than a maximum color component density level of the pixel. Consequently, it is possible to set the under color removal value for each pixel of at least a part of pixels judged to belong to the black text area to be larger than an under color removal value in a conventional case where the under color removal value is set to be a minimum color component density level, which results in reduction of color fringing in the black text area. Further, by setting the under color removal for the pixel to be smaller than a maximum color component density level, it is possible to leave a color component of a page background in the pixel (for example, a color component of a color page background or a halftone dot in image data obtained by reading a text on the color page background or a text on the halftone dot), which prevents a white spot on the black text area.

Further, the image processing apparatus may be arranged so that: the segmentation section includes a density judgment section for judging whether a pixel or a block judged to belong to the black text area belongs to a high density area or a low density area, and the under color removal section uses the under color removal value in the under color removal process with respect to a pixel judged by the density judgment section to belong to a low density area.

With the arrangement, the density judgment section judges whether a pixel or a block judged to belong to the black text area belongs to the high density area or the low density area. The under color removal section uses the under color removal value in the under color removal process with respect to a pixel judged to belong to the low density area. Consequently, it is possible to set the under color removal value for the pixel judged to belong to the low density area to be larger than an under color removal value in a conventional case where the under color removal value is set to be a minimum color component density level, which results in reduction of color fringing in the low density area (periphery of a black text or a black line). Further, by setting the under color removal value for the pixel to be smaller than a maximum color component density level, it is possible to leave a color component of a page background in the pixel, which prevents a white spot on an edge of a text or a line.

Further, the image processing apparatus may be arranged so that: the under color removal section performs the under color removal process so that an under color removal value for a pixel judged by the density judgment section to belong to a low density area is larger than an under color removal value corresponding to a case of a pixel judged by the density judgment section to belong to a high density area.

With the arrangement, it is possible not only to appropriately represent a black text or a black line but also to prevent a generation of a color component on the periphery of the black text or the black line or to prevent a generation of a white spot. Therefore, it is possible to further increase reproducibility of the black text or the black line.

Further, the image processing apparatus may be arranged so as to further include a black generation section for generating a signal having a black component based on image data including a plurality of color components, the black generation section generating the signal so that a density level of a black component of a pixel judged by the density judgment section to belong to a low density area is lower than a density level of a black component of a pixel judged by the density judgment section to belong to a high density area. For example, the image processing apparatus may be arranged so that the density level of the black component is set to be low in the low density area, or black generation is not performed in the low density area.

With the arrangement, by setting the density level of the black color component to be low in the low density area, it is possible to prevent a black text or a black line from being thicker or darker than that in input image data.

Further, the image processing apparatus may be arranged so that: the under color removal section sets the under color removal value to be (i) a middle value of color component density levels, (ii) an average value among the color component density levels of the pixel, (iii) an average value among color component density levels of the pixel, which color component density levels include at least the maximum color component density level and the minimum color component density level, (iv) a value calculated based on the middle value or either of the average values, or (v) a product of the minimum color component density level and a constant value more than 1. Here, the value calculated based on the middle value or either of the average values is, for example, a value which is a product of the middle value or either of the average values and a predetermined coefficient, or a value obtained by an arbitrary function having the middle value or either of the average values as a variable.

Further, the image processing apparatus may be arranged so as to further include a storage section for storing (i) the under color removal values or (ii) color component density levels which have been subjected to the under color removal process, said under color removal values or said color component density levels corresponding to image data inputted to the under color removal section, the under color removal section performing the under color removal process by use of the under color removal values or the color component density levels stored in the storage section.

With either of the arrangements, even when chromatic aberration occurs in reading a document by use of an image input apparatus (e.g. scanner) for example, it is possible not only to prevent a generation of a color component on the periphery of the black text or the black line or to prevent a generation of a white spot. Therefore, it is possible to increase reproducibility of the black text or the black line.

The image forming apparatus of the present invention includes any one of the above image processing apparatuses. Therefore, the image forming apparatus can output an image with a high quality, in which color fringing and a white spot on a periphery of a black text or a black line is reduced.

The image processing program of the present invention causes a computer to function as each section included in any one of the above image processing apparatuses. By causing a computer to read the program, it is possible for the computer to realize the process of each section of the image processing apparatus of the present invention.

Further, by storing the program in a computer-readable storage medium, it is possible to easily store and circulate the program. Further, by causing the computer to read the storage medium, it is possible for the computer to perform the process of each section of the image processing apparatus of the present invention.

The present invention is applicable to an image processing apparatus which performs a color conversion process in which input image data is converted into output image data including black.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus, which performs a black generation process and an under color removal process with respect to image data including a plurality of color components, comprising:
    a segmentation section for judging whether each pixel or each block including a plurality of pixels in the image data belongs to a black text/low density area or not; and
    an under color removal section for performing the under color removal process with respect to the image data,
    the under color removal section performing the under color removal process so that an under color removal value for each pixel of at least a part of pixels judged by the segmentation section to belong to a black text/low density area is larger than a minimum color component density level and smaller than a maximum color component density level of the pixel,
    the segmentation section including:
    a text area judging section for judging whether each pixel in the image data belongs to a text area or not;
    an edge detecting section for judging whether a pixel judged by the text area judging section to belong to a text area is an edge of a text or a line;
    a pattern matching section for judging whether a pattern of pixels judged by the edge detecting section to be an edge of a text or a line is identical with a template prepared in advance for detecting texts;
    a color judging section for judging whether a color of a pixel judged by the pattern matching section to belong to a pattern identical with the template is a chromatic color or an achromatic color; and
    a density judgment section for judging whether a pixel judged by the color judging section to be an achromatic color or a block of pixels each judged by the color judging section to be an achromatic color belongs to a high density area or a low density area,
    the segmentation section determining that a pixel is a pixel belonging to the black text/low density area, if (i) the pixel is judged by the edge detecting section to be an edge, (ii) the pixel constitutes a pattern judged by the pattern matching section to belong to a pattern identical with a template, (iii) a color of the pixel is judged by the color judging section to be an achromatic color, and (iv) the pixel is judged by the density judgment section to belong to a low density area, and
    the under color removal section performing the under color removal process such that an under color removal value for a pixel that belongs to the black text/low density area is set to be larger than a minimum color component density level and smaller than a maximum color component density level of the pixel, and such that an under color removal value for a pixel that belongs to an area other than the black text/low density area is set in accordance with a minimum color component density level of the pixel.

2. The image processing apparatus as set forth in claim 1, wherein the under color removal section performs the under color removal process so that an under color removal value for a pixel judged by the density judgment section to belong to a lows density area is larger than an under color removal value corresponding to a case of a pixel judged by the density judgment section to belong to a high density area.

3. The image processing apparatus as set forth in claim 1, further comprising a black generation section for generating a signal of a black component based on the image data including a plurality of color components, the black generation section generating the signal so that a density level of a black component of a pixel judged by the density judgment section to belong to a low density area is lower than a density level of a black component of a pixel judged by the density judgment section to belong to a high density area.

4. The image processing apparatus as set forth in claim 1, wherein the under color removal section sets the under color removal value to be (i) a middle value of color component density levels of the pixel, (ii) an average value among the color component density levels of the pixel, (iii) an average value among color component density levels of the pixel, which color component density levels include at least the maximum color component density level and the minimum color component density level, (iv) a value calculated based on the middle value or either of the average values, or (v) a product of the minimum color component density level and a constant value more than 1.

5. The image processing apparatus as set forth in claim 1, further comprising a storage section for storing (i) the under color removal values or (ii) color component density levels which have been subjected to the under color removal process, said under color removal values or said color component density levels corresponding to image data inputted to the under color removal section, the under color removal section performing the under color removal process by use of the under color removal values or the color component density levels stored in the storage section.

6. An image forming apparatus, comprising an image processing apparatus which performs a black generation process and an under color removal process with respect to image data including a plurality of color components, said image processing apparatus including:
- a segmentation section for judging whether each pixel or each block including a plurality of pixels in the image data belongs to a black text/low density area or not; and
- an under color removal section for performing the under color removal process with respect to the image data,
- the under color removal section performing the under color removal process so that an under color removal value for each pixel of at least a part of pixels judged by the segmentation section to belong to a black text/low density area is larger than a minimum color component density level and smaller than a maximum color component density level of the pixel,
- the segmentation section including:
- a text area judging section for judging whether each pixel in the image data belongs to a text area or not;
- an edge detecting section for judging whether a pixel judged by the text area judging section to belong to a text area is an edge of a text or a line;
- a pattern matching section for judging whether a pattern of pixels judged by the edge detecting section to be an edge of a text or a line is identical with a template prepared in advance for detecting texts;
- a color judging section for judging whether a color of a pixel judged by the pattern matching section to belong to a pattern identical with the template is a chromatic color or an achromatic color; and
- a density judgment section for judging whether a pixel judged by the color judging section to be an achromatic color or a block of pixels each judged by the color judging section to be an achromatic color belongs to a high density area or a low density area,
- the segmentation section determining that a pixel is a pixel belonging to the black text/low density area, if (i) the pixel is judged by the edge detecting section to be an edge, (ii) the pixel constitutes a pattern judged by the pattern matching section to belong to a pattern identical with a template, (iii) a color of the pixel is judged by the color judging section to be an achromatic color, and (iv) the pixel is judged by the density judgment section to belong to a low density area, and
- the under color removal section performing the under color removal process such that an under color removal value for a pixel that belongs to the black text/low density area is set to be larger than a minimum color component density level and smaller than a maximum color component density level of the pixel, and such that an under color removal value for a pixel that belongs to an area other than the back text/low density area is set in accordance with a minimum color component density level of the pixel.

7. A tangible storage medium, which fluidly stores a program in a computer-readable manner for downloading therefrom to a computer to perform a black generation process and an under color removal process with respect to image data including a plurality of color components;
said program causing a computer to function as:
- a segmentation section for judging whether each pixel or each block including a plurality of pixels in the image data belongs to a black text/low density area or not; and
- an under color removal section for performing the under color removal process with respect to the image data,
- the under color removal section performing the under color removal process so that an under color removal value for each pixel of at least a part of pixels judged by the segmentation section to belong to a black text/low density area is larger than a minimum color component density level and smaller than a maximum color component density level,
- the segmentation section including:
- a text area judging section for judging whether each pixel in the image data belongs to a text area or not;
- an edge detecting section for judging whether a pixel judged by the text area judging section to belong to a text area is an edge of a text or a line;
- a pattern matching section for judging whether a pattern of pixels judged by the edge detecting section to be an edge of a text or a line is identical with a template prepared in advance for detecting texts;
- a color judging section for judging whether a color of a pixel judged by the pattern matching section to belong to a pattern identical with the template is a chromatic color or an achromatic color; and
- a density judgment section for judging whether a pixel judged by the color judging section to be an achromatic color or a block of pixels each judged by the color judging section to be an achromatic color belongs to a high density area or a low density area,
- the segmentation section determining that a pixel is a pixel belonging to the black text/low density area, if (i) the pixel is judged by the edge detecting section to be an edge, (ii) the pixel constitutes a pattern judged by the pattern matching section to belong to a pattern identical with a template, (iii) a color of the pixel is judged by the color judging section to be an achromatic color, and (iv) the pixel is judged by the density judgment section to belong to a low density area, and
- the under color removal section performing the under color removal process such that an under color removal value for a pixel that belongs to the black text/low density area is set to be larger than a minimum color component density level and smaller than a maximum color component density level of the pixel, and such that an under color removal value for a pixel that belongs to an area other than the black text/low density area is set in accordance with a minimum color component density level of the pixel.

* * * * *